(12) United States Patent
Tee et al.

(10) Patent No.: US 7,247,248 B2
(45) Date of Patent: Jul. 24, 2007

(54) METHOD OF FORMING ATOMIC FORCE MICROSCOPE TIPS

(75) Inventors: Lay Har Angeline Tee, Singapore (SG); Kim Pong Daniel Chir, Singapore (SG); Kitt-Wai Kok, Singapore (SG); Kathirgamasundaram Sooriakumar, Singapore (SG); Bryan Keith Patmon, Singapore (SG)

(73) Assignee: Sensfab Pte Ltd, Singapore (SG)

( * ) Notice: Subject to any disclaimer, the term of this patent is extended or adjusted under 35 U.S.C. 154(b) by 0 days.

(21) Appl. No.: 10/516,927

(22) PCT Filed: May 20, 2003

(86) PCT No.: PCT/SG03/00119

§ 371 (c)(1),
(2), (4) Date: Dec. 1, 2004

(87) PCT Pub. No.: WO03/102966

PCT Pub. Date: Dec. 11, 2003

(65) Prior Publication Data

US 2005/0161430 A1    Jul. 28, 2005

(30) Foreign Application Priority Data

Jun. 3, 2002    (SG)    .............................. 200203275-3

(51) Int. Cl.
*B81C 1/00*    (2006.01)

(52) U.S. Cl. ............................ 216/11; 216/36; 216/57; 216/62; 216/72; 216/79; 216/87; 216/99

(58) Field of Classification Search ..................... None
See application file for complete search history.

(56) References Cited

U.S. PATENT DOCUMENTS

| 4,307,507 | A | * | 12/1981 | Gray et al. | .................... 438/20 |
| 4,668,865 | A | * | 5/1987 | Gimzewski et al. | ......... 250/306 |
| 4,685,996 | A | * | 8/1987 | Busta et al. | ................... 438/20 |
| 4,943,719 | A | * | 7/1990 | Akamine et al. | ........... 250/306 |
| 5,066,358 | A | * | 11/1991 | Quate et al. | .................... 216/2 |
| 5,116,462 | A | * | 5/1992 | Bartha et al. | ................... 216/2 |
| 5,336,369 | A |   | 8/1994 | Kado et al. |  |
| 5,367,165 | A | * | 11/1994 | Toda et al. | ................. 250/306 |
| 5,614,663 | A |   | 3/1997 | Itoh et al. |  |

(Continued)

FOREIGN PATENT DOCUMENTS

| JP | 2001-21478 | 1/2001 |
| WO | WO 01/06516 A1 | 1/2001 |

*Primary Examiner*—Allan Olsen
(74) *Attorney, Agent, or Firm*—Wells St. John P.S.

(57) ABSTRACT

The invention relates to a method for forming silicon atomic force microscope tips. The method includes the steps of depositing a masking layer onto a first layer of doped silicon so that some square or rectangular areas of the first layer of doped silicon are not covered by the masking layer, etching pyramidal apertures in the first layer of doped silicon, removing the masking layer, depositing a second layer of doped silicon onto the first layer of doped silicon, the second layer of doped silicon being oppositely doped to the first layer of doped silicon and etching away the first layer of doped silicon. Further steps may be added to form the atomic force microscope tips at the end of cantilevers.

6 Claims, 2 Drawing Sheets

U.S. PATENT DOCUMENTS

| | | |
|---|---|---|
| 5,883,387 A * | 3/1999 | Matsuyama et al. ........ 250/306 |
| 5,965,218 A | 10/1999 | Bothra et al. |
| 5,994,160 A * | 11/1999 | Niedermann et al. ......... 438/53 |
| 6,156,216 A * | 12/2000 | Manalis et al. ............... 216/11 |
| 6,281,621 B1 * | 8/2001 | Nakamoto et al. .......... 313/309 |
| 6,680,900 B1 * | 1/2004 | Takahashi et al. .......... 369/300 |
| 6,765,300 B1 * | 7/2004 | Wagenaar et al. .......... 257/780 |
| 6,794,296 B1 * | 9/2004 | Kassing et al. ............. 438/706 |
| 2003/0202456 A1 * | 10/2003 | Hong et al. .................. 369/126 |
| 2004/0139794 A1 * | 7/2004 | Minne ......................... 73/104 |

* cited by examiner

METHOD OF FORMING ATOMIC FORCE MICROSCOPE TIPS

RELATED PATENT DATA

This application claims priority to Patent Cooperation Treaty application Serial No. PCT/SG03/00119, which was filed May 20, 2003, and which claims priority to Singapore Application Ser. No. 200203275-3, which was filed Jun. 3, 2002.

FIELD OF INVENTION

The invention relates to atomic force microscope tips and more particularly for a method of forming silicon atomic force microscope tips using etching techniques.

BACKGROUND

Atomic force microscope tips are used to measure the topography of surfaces at an atomic level. In atomic force microscopy an atomic tip is scanned over a surface and the interactions between the few atoms at the end of the tip and the surface are recorded. The sharpness of the tip, or its radius of curvature, determines the resolution of the scan. Some atomic force microscope tips are formed at the edge of a cantilever. With cantilevered atomic force microscope tips the motion of the cantilever may be recorded to determine the topography of the surface being scanned. Atomic force microscopy may also be used in the manufacture of integrated circuits (IC) to measure the dimensions of components on the IC. There are also developments of applications for atomic force microscopy in the area of data storage. In this application shaper tips will enable a higher data density to be achieved since more data bits can be written per square area.

One method for forming atomic force microscope tips uses conventional electron beam chemical vapour deposition (CVD). This method as described in U.S. Pat. No. 5,611,942 involves first forming a rounded tip. Masks are then added to the tip in areas where points will be formed. The mask covered tip is then etched for a predetermined period of time. The etching process removes the tip material in a parabolic manner between the masks leaving points under the mask layers. Finally the mask layer is removed to reveal a multi-pointed atomic force microscope tip. One problem with this method is ensuring uniformity of the etching process to form uniform tips. A further problem is that the tips tend to break off before they are sharp, leaving a fractured end.

Another method for forming atomic force microscope tips is to etch pyramidal pits into silicon with an etchant such as potassium hydroxide (KOH). These pits are then used as a mould for a silicon nitride tip. Common materials deposited in the mould include polymers, silicon dioxide and silicon nitride. Any moulded tip formed in this manner must be separated from the mould. In addition to the difficulty in ensuring a clean separation of the tips from the moulds, this method may not be applicable to more complex types of MEMS (microelectromechanical) structures. Further to this tips formed from silicon have superior physical properties, such as high strength and stiffness, when compared to tips formed from other materials.

SUMMARY OF INVENTION

It is the object of the invention to provide a method for forming atomic force microscope tips in silicon that overcome the disadvantages mentioned above or to at least provide the public with a useful choice.

In broad terms the invention comprises a method for forming a silicon atomic force microscope tip including the steps of depositing a masking layer onto a first layer of doped silicon so that some square or rectangular areas of the first layer of doped silicon are not covered by the masking layer, etching pyramidal apertures in the first layer of doped silicon, removing the masking layer, depositing a second layer of doped silicon onto the first layer of doped silicon, the second layer of doped silicon being oppositely doped to the first layer of doped silicon and etching away the first layer of doped silicon.

Before the first layer of doped silicon is etched the invention may further include the steps of performing an anisotropic wet etch on the second layer of silicon to provide at least one raised area, fusion bonding a third layer of silicon over the raised area to form at least one cavity between the second layer and the third layer. Following the step of etching away the first layer of doped silicon the invention may further include the steps of depositing a masking layer over the second layer of silicon on the side previously in contact with the first layer of silicon, patterning the masking layer to include an area of no masking at one side of a tip, performing a release etch to remove silicon above the cavity not covered by the masking layer, and removing the masking layer.

BRIEF DESCRIPTION OF DRAWINGS

A preferred from method of the invention will be further described with reference to the accompanying drawings by way of example only and without intending to be limiting, wherein.

DETAILED DESCRIPTION

Figure 1A:
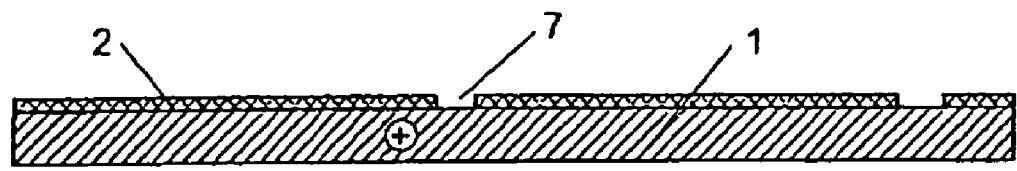
FIG. 1A shows a layer of silicon partially covered with a masking layer.

FIG. 1A shows a layer of silicon 1 substantially covered by a masking layer 2. The masking layer is deposited such that rectangular or square areas 7 are uncovered. These areas are those where atomic force microscope tips will be formed. The silicon is either p-type doped silicon or n-type doped silicon.

After depositing the masking layer 2 on the silicon pyramidal openings are formed in the doped silicon layer by etching with a strong base etchant, for example potassium hydroxide (KOH).

The crystal structure of silicon is a zinc blende lattice with identical atoms in each sublattice. The silicon crystal can be oriented along several planes. These planes are denoted by coordinates. For example <100>, <110> and <111> are all different planes within the silicon crystal. When etching a single crystal, certain etchants exhibit orientation dependent etch rates. In particular strong base etchants, such as potassium hydroxide (KOH), tetramethyl ammonium hydroxide (TMAH) and ethylene diamine pyrochatecol (EDP), exhibit highly orientation dependent etch characteristics in silicon.

Using a strong base etchant the etch rate in silicon is highly dependent on the direction of the crystal plane in the silicon. The <100> and <110> planes etch much faster than the <111> plane. The aspect ratio of the tip is therefore limited by the crystallographic structure of the etch pit material. Using single crystal silicon the <111> planes effectively form etch stops that enable a mould with accurate dimensions and a sharp tip to be formed. The sides of the aperture formed in the single crystal silicon forms an etch angle of 54.7° to the horizontal. Varying the mask opening sizes can easily be used to form different tip heights. The size of the apertures formed using strong base etching can therefore be controlled by the size of the aperture in the masking layer.

Figure 1B:
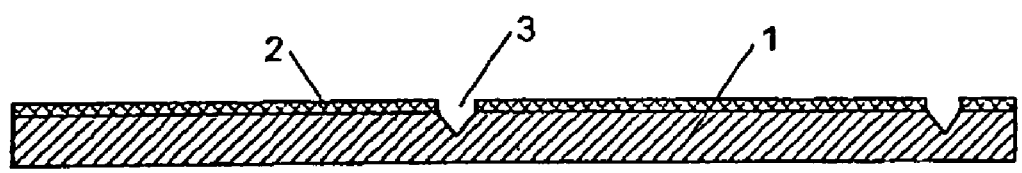
FIG. 1B shows the layer of silicon and masking layer after a wet etch.

FIG. 1B shows the results of the etching process. The etchant is ideally a strong base and may be, for example, KOH, TMAH or EDP. In a KOH etch a 45% concentration is commonly used as an etchant. Isopropyl alcohol is also sometimes added to improve the selectivity of the etch. The common temperature range of a KOH etch is between 50° C. and 85° C. The temperature of the etch affects the etch rate with the etch rate increasing as the temperature increases.

Figure 1C:
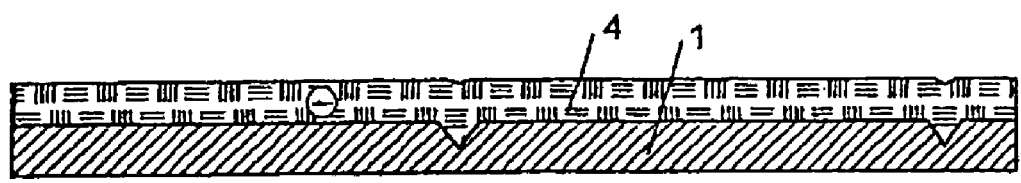
FIG. 1C shows a second layer of silicon bonded to the first layer of silicon.

Following etching with the strong base etchant the masking layer is removed using known techniques. A layer is epitaxial silicon is then deposited onto the layer of doped silicon and fills the apertures formed by the KOH etching as shown in FIG. 1C. The layer of epitaxial silicon is doped to have the opposite doping of the first layer of silicon. For example if the first layer of silicon is p-type doped then the layer of epitaxial silicon is n-type doped and if the first layer of silicon is n-type doped then the layer of epitaxial silicon is p-type doped.

Figure 1D:
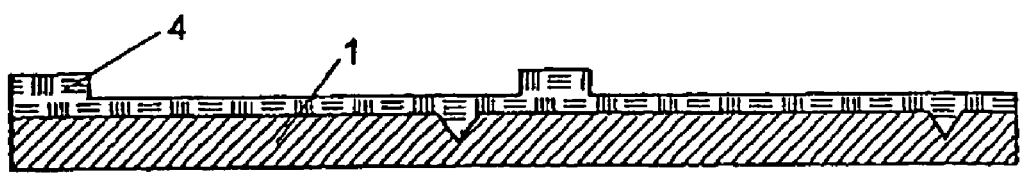
FIG. 1D shows the results of an anisotropic etch on the second layer of silicon.
Figure 1E:
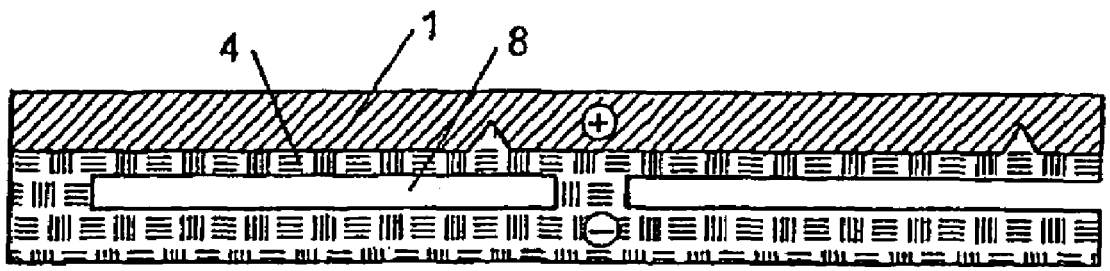
FIG. 1E shows a third layer of silicon bonded to the second layer of silicon.

FIG. 1D shows the results of an anisotropic etch. This etch forms troughs and raised areas in the epitaxial silicon layer 4. In FIG. 1E a second layer of silicon has been fusion bonded to the layer of epitaxial silicon. This forms cavities 8 between the two layers. Ideally the second layer of silicon has the same doping as the layer of epitaxial silicon.

Following the bonding of the two layers of silicon the first layer of silicon 1 is removed by electrochemical etch. Because the first layer of silicon and the epitaxial layer of silicon 4 are doped differently the boundary between the two layers forms a diode junction. This diode junctions acts as a stop for the electrochemical etch. This allows the first layer of silicon 1 to be removed leaving the tips formed in the layer of epitaxial silicon 4 and solves the problems of removing the tips from the mould.

Figure 1F:
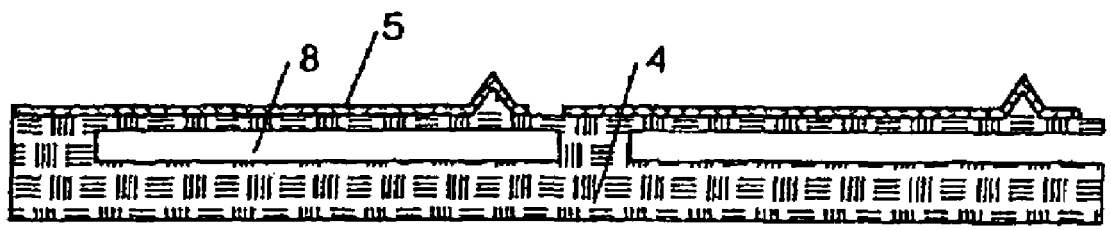
FIG. 1F shows a masking layer deposited onto the second layer of silicon.

FIG. 1F shows the layer of epitaxial silicon 4 with cavity 8 after removal of the first layer of silicon. As masking layer 5 is deposited onto the epitaxial silicon 4. The masking layer 5 covers the atomic force microscope tips but is deposited to leave a gap after each tip.

Figure 1G:
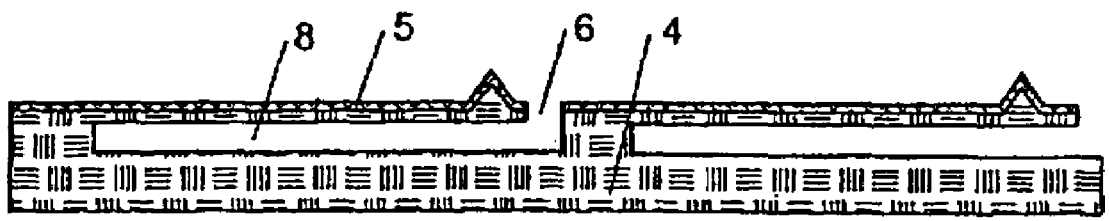
FIG. 1G shows a cantilevered atomic force microscope tip formed by a release etch on the second layer of silicon.

FIG. 1G shows the results of a release etch. This etches away the epitaxial silicon not covered by masking layer 5. This releases the tip from the nearest raised layer of epitaxial silicon 4 and leaves the tip cantilevered. Finally the masking layer 5 is removed to leave the cantilevered atomic force microscope tips.

Other process steps can be added to this process to form other MEMS structures such as actuators or features such as metal interconnects/bondpads.

In another embodiment the steps illustrated in FIGS. 1D to 1G are omitted and the first layer of silicon 1 is removed by electrochemical etch after the step of depositing the layer of epitaxial silicon 4 shown in FIG. 1C. In this embodiment the atomic force microscope tips formed using the method of the invention are not cantilevered. Again further stops can be added to this process to form other MEMS structures or other features.

Using the method of the invention atomic force microscope tips have been produced with a base of 4×4 microns and height of 2.82 microns. The tips produced using the method of the invention are formed of silicon and have superior stiffness and strength to tips formed of other materials such as silicon nitride, silicon dioxide etc. Atomic force microscope tips formed using the method of the invention are more uniform than those formed using chemical vapour deposition.

The foregoing describes the invention including preferred forms thereof. Alterations and modifications as will be obvious to those skilled in the art are intended to be incorporated within the scope hereof as defined in the accompanying claims.

The invention claimed is:

1. A method of. . .
   (a) depositing a masking layer onto a first layer of doped silicon so that some square or rectangular areas of the first layer of doped silicon are not covered by the masking layer,
   (b) etching pyramidal apertures in the first layer of doped silicon,
   (c) removing the masking layer,
   (d) depositing a second layer of doped silicon onto the first layer of doped silicon, the second layer of doped silicon being oppositely doped to the first layer of doped silicon,
   (e) etching away the first layer of doped silicon,
   (f) before the first layer of doped silicon is etched in step (e) performing an anisotropic wet etch on the second layer of silicon to provide at least one raised area,
   (g) fusion bonding a third layer of silicon over the raised area to form at least one cavity between the second layer and the third layer,
   (h) following the step of etching away the first layer of doped silicon in step (e)
   depositing a second masking layer over the second layer of silicon on the side previously in contact with the first layer of silicon,
   (i) patterning the second masking layer to include an area of no masking at one side of a tip,
   (j) performing a release etch to remove silicon above the cavity not covered by the second masking layer, and
   (k) removing the second masking layer.

2. A method of forming silicon atomic force microscope tips as claimed in claim 1 wherein the third layer of silicon has the same doping as the second layer of silicon.

3. A method of forming silicon atomic force microscope tips including the steps of:
   (a) depositing a masking layer onto a first layer of doped silicon so that some square or rectangular areas of the first layer of doped silicon are not covered by the masking layer,
   (b) etching pyramidal apertures in the first layer of doped silicon,
   (c) removing the masking layer, (d) depositing a second layer of doped silicon onto the first layer of doped silicon, the second layer of doped silicon being oppositely doped to the first layer of doped silicon, (e) etching away the first layer of doped silicon, (f) before the first layer of doped silicon is etched in step (e) performing an anisotropic wet etch on the second layer of silicon to provide at least one raised area, (g) fusion bonding a third layer of silicon over the raised area to form at least one cavity between the second layer and the third layer, (h) following the step of etching away the first layer of doped silicon in step (e)

depositing a second masking layer over the second layer of silicon on the side previously in contact with the first layer of silicon, (i) patterning the second masking layer to include an area of no masking at one side of a tip, (j) performing a release etch to remove silicon above the cavity not covered by the second masking layer, and (k) removing the second masking layer, wherein the etch in step (e) is and electrochemical etch.

4. A method of forming silicon atomic force microscope tips as claimed in claim 3 wherein the third layer of silicon has the same doping as the second layer of silicon.

5. A method of forming silicon atomic force microscope tips including the steps of:

(a) depositing a masking layer onto a first layer of doped silicon so that some square or rectangular areas of the first layer of doped silicon are not covered by the masking layer, (b) etching pyramidal apertures in the first layer of doped silicon, (c) removing the masking layer, (d) depositing a second layer of doped silicon onto the first layer of doped silicon, the second layer of doped silicon being oppositely doped to the first layer of doped silicon, (e) etching away the first layer of doped silicon, (f) before the first layer of doped silicon is etched in step (e) performing an anisotropic wet etch on the second layer of silicon to provide at least one raised area, (g) fusion bonding a third layer of silicon over the raised area to form at least one cavity between the second layer and the third layer, (h) following the step of etching away the first layer of doped silicon in step (e)

depositing a second masking layer over the second layer of silicon on the side previously in contact with the first layer of silicon, (i) patterning the second masking layer to include an area of no masking at one side of a tip, (j) performing a release etch to remove silicon above the cavity not covered by the second masking layer, and (k) removing the second masking layer, wherein the first layer of silicon is p-type doped silicon and the second layer of silicon is n-type doped silicon.

6. A method of forming silicon atomic force microscope tips as claimed in claim 5 wherein the third layer of silicon has the same doping as the second layer of silicon.

* * * * *

UNITED STATES PATENT AND TRADEMARK OFFICE
CERTIFICATE OF CORRECTION

PATENT NO. : 7,247,248 B2 Page 1 of 1
APPLICATION NO. : 10/516927
DATED : July 24, 2007
INVENTOR(S) : Tee et al.

It is certified that error appears in the above-identified patent and that said Letters Patent is hereby corrected as shown below:

Column 2, Line 56 – Replace "silicon I" with --silicon 1--.

Column 4, Line 27 – Replace "A method of…" with --A method of forming silicon atomic force microscope tips including the steps of:--.

Column 5, Line 22 – Replace "is and electrochemical" with --is an electrochemical--.

Signed and Sealed this

Fifteenth Day of April, 2008

JON W. DUDAS
*Director of the United States Patent and Trademark Office*